Patented Sept. 4, 1945

2,384,049

UNITED STATES PATENT OFFICE 2,384,049

PROCESS FOR THE PRODUCTION OF POLYNITROETHYLENE

Arthur Ernest Wilder Smith, Charles William Scaife, and Robert Holroyd Stanley, Norton-on-Tees, England, assignors to Imperial Chemical Industries Limited, a corporation of Great Britain No Drawing. Application December 15, 1943, Serial No. 514,418. In Great Britain December 4, 1942

2 Claims. (Cl. 260—644)

This invention relates to the production of polymerised nitroethylene.

We have found that polymerised nitroethylene is formed by reacting β-nitroethyl nitrate with a carbonate, bicarbonate or hydroxide of an alkali metal, alkaline earth metal, magnesium or ammonium or an oxide, hydroxide, or carbonate of zinc or lead in the presence of an aqueous medium.

The reaction can be carried out at normal temperature, but higher or lower temperatures may be used.

It is desirable to add the β-nitroethyl nitrate to the aqueous medium containing the carbonate, bicarbonate or hydroxide, and to add it in small amounts at first in order to give the reaction time to start. It is also preferable to add β-nitroethyl nitrate in the form of a solution in a suitable organic solvent miscible with water, for example, methanol, dioxan, acetone, ethanol. Vigorous stirring is beneficial in promoting complete reaction.

Example 1

15 gms. of β-nitroethyl nitrate were dissolved in 150 ccs. of methanol, and a caustic soda solution was also prepared by dissolving 4.6 gms. of caustic soda in 150 ccs. of water. The solution of β-nitroethyl nitrate was stirred continuously and approximately 5 ccs. of the caustic soda solution were run in. In about ½ minute the solution had assumed a yellowish tinge, and the remainder of the caustic soda solution was then added. After 20 minutes, 50 ccs. of 10% hydrochloric acid were added and the stirring was continued for a further 5 minutes. Polymerised nitroethylene formed as a pale yellow powder which was separated from the liquid by filtration, washed with water and then with methanol. The drying of the polymer was completed by drawing a stream of air through it. The yield of polymerised nitroethylene in the form of a pale yellow powder was 4.2 gms.

Example 2

15 gms. of β-nitroethyl nitrate were dissolved in 150 ccs. of methanol, and 6 gms. of soda ash were also dissolved in 150 ccs. of water. The solution of β-nitroethyl nitrate was then stirred continuously and 5 ccs. of the soda ash solution run in. The solution rapidly assumed a yellowish tinge and the remainder of the soda ash solution was then added. After a further 20 minutes stirring the precipitated polymerised nitroethylene was removed by filtration, washed with 10% hydrochloric acid, then with water, and finally with methanol. The final drying of the polymer was carried out by drawing a stream of air through it. The yield of polymer in the form of a pale yellow powder was found to be 6.5 gms.

Example 3

15.25 gms. of β-nitroethyl nitrate were dissolved in 100 ccs. of dioxan, and 8.6 gms. of ammonium bicarbonate were dissolved in 100 ccs. of water. The solution of β-nitroethyl nitrate was stirred continuously and 5 ccs. of the bicarbonate solution were run in. After a few seconds the solution began to froth, and the remainder of the bicarbonate solution was then added. Stirring was continued for a further 20 minutes after which the polymerised nitroethylene which had been precipitated was removed by filtration. The polymer was washed with 10% hydrochloric acid, then with water, and finally with methanol. Final drying was carried out by passing a stream of air through the polymer. The yield of polymer in the form of a pale yellow powder was 6.6 gms.

Example 4

15 gms. of β-nitroethyl nitrate were dissolved in 100 ccs. of acetone, and 8.7 gms. of ammonium bicarbonate were dissolved in 100 ccs. of water. The solution of β-nitroethyl nitrate was stirred continuously and 5 ccs. of the bicarbonate solution were run in. After a few seconds the solution began to froth, and the remainder of the bicarbonate solution was then added. The stirring was continued for a further 20 minutes after which the polymerised nitroethylene which had been precipitated was removed by filtration, washed with 10% hydrochloric acid, then with water, and finally with methanol. Air was drawn through the polymer to complete the drying. The yield of polymer in the form of a pale yellow powder was 6.5 gms.

We claim:

1. A process for the preparation of polymerised nitroethylene which comprises reacting β-nitroethyl nitrate in the presence of an aqueous medium with a substance selected from the group: alkali metal carbonate, alkali metal hydroxide, alkali metal bicarbonate, alkaline earth metal carbonate, alkaline earth metal hydroxide, alkaline earth metal bicarbonate, ammonium carbonate, ammonium bicarbonate, ammonium hydroxide, magnesium carbonate, magnesium bicarbonate, magensium hydroxide, zinc carbonate, zinc oxide, zinc hydroxide, lead oxide, lead hydroxide, lead carbonate.

2. A process for the preparation of polymerised nitroethylene which comprises reacting β-nitroethyl nitrate dissolved in an organic water-miscible solvent, with water containing a substance selected from the group: alkali metal carbonate, alkali metal hydroxide, alkali metal bicarbonate, alkaline earth metal carbonate, alkaline earth metal hydroxide, alkaline earth metal bicarbonate, ammonium carbonate, ammonium bicarbonate, ammonium hydroxide, magnesium carbonate, magnesium bicarbonate, magnesium hydroxide, zinc carbonate, zinc oxide, zinc hydroxide, lead oxide, lead hydroxide, lead carbonate.

ARTHUR ERNEST WILDER SMITH.
CHARLES WILLIAM SCAIFE.
ROBERT HOLROYD STANLEY.